United States Patent [19]

Chung-Suk

[11] Patent Number: 5,254,042

[45] Date of Patent: Oct. 19, 1993

[54] TRANSMISSION DEVICE ASSEMBLY FOR A BICYCLE

[76] Inventor: Kim Chung-Suk, Ga/109, Daeheung Apartment, 134-1, Ojeong-dong Jung-ku, Buchen-shi, Kyonggi-do, Rep. of Korea

[21] Appl. No.: 886,034

[22] Filed: May 20, 1992

[30] Foreign Application Priority Data

May 20, 1991 [KR] Rep. of Korea ............... 91-7179
Mar. 25, 1992 [KR] Rep. of Korea ............... 92-4792

[51] Int. Cl.$^5$ ............................................. F16H 59/00
[52] U.S. Cl. ......................................... 474/69; 474/84
[58] Field of Search ................................. 474/69–73, 474/84–86, 88–89; 280/259–261, 231–233

[56] References Cited

U.S. PATENT DOCUMENTS 3,913,944 10/1975 Blow, Jr. ...................... 474/84 X
4,398,740 8/1983 Clem ............................ 474/84 X Primary Examiner—Thuy M. Bui
Attorney, Agent, or Firm—Mathews, Woodbridge & Collins

[57] ABSTRACT

A transmission device for a bicycle is provided including a first transmission for obtaining a forward driving force. The first transmission drives a first free wheel in conformity with movement of a first drive unit when a crank shaft is forwardly rotated. A second transmission obtains a forward driving force by converting a direction of the rotating force produced in a rotational direction of a second drive unit. The rotational direction is supplied to a second free wheel under a reverse rotation of the crank shaft. A forward driving force is obtained regardless of the rotational direction of the crank shaft, thereby improving an exercise effect.

11 Claims, 7 Drawing Sheets

TRANSMISSION DEVICE ASSEMBLY FOR A BICYCLE

BACKGROUND OF THE INVENTION

1. Field of the Invention

The present invention relates to a transmission device assembly, more particularly, to a transmission device for a bicycle, which allows to continuously obtain the forward driving force even if the crank shaft is changed in rotational direction forwardly or reversely.

2. Description of the Prior Art

With a conventional bicycle, forward driving force can be obtained if only a crank shaft is rotated in a forward direction. The bicycle generally includes a forward fork 2 for mounting a front wheel 1 a backward fork 4 for mounting a rear wheel-3 ; and, a frame F having a cross bar 5 for connecting the forks 3 and 4 with each other. The frame F has diagonally extended forward and backward bars 6 and 7 of which the lower end portions are integrally connected to a general hub.

Moreover, a chain gear 8 and a pair of pedals are coupled operationally to the crank shaft 9, and a free wheel 10 is coupled to a backward hub. Also, a driving chain 11 is engaged with the peripheral portions of the chain gear 8 and the free wheel 10 so as to obtain a driving force of the bicycle according to the rotation thereof.

With the transmission device for the bicycle constructed as described above, the driving chain 11 is disposed so that, when the crank shaft 9 is rotated, a sprocket of the free wheel 10 is rotated in a direction equal to the rotational direction of the crank shaft 9. As a result, when the crank shaft 9 is rotated in a forward direction, the forward driving force can be produced. Alternatively, if the crank shaft 9 is rotated in a reverse direction, the forward driving force can't be produced since the sprocket of the free wheel 10 is in an idle state. Accordingly, in order to obtain the forward driving force for the bicycle, the latter must be handled in a constant driving direction. Therefore, there are defects that the driving operation is monotonous and an effect of exercise is insufficient.

SUMMARY OF THE INVENTION

Accordingly, the present invention has been made to solve the aforementioned defects and an object of the invention is to provide a transmission device for a bicycle, wherein forward driving force can be produced even if a crank shaft of the bicycle is rotated forwardly or backwardly.

Another object of the invention is to provide a transmission device for a bicycle, wherein a forward motion velocity obtained in case that a crank shaft is reversely rotated can be changed.

In order to achieve the aforementioned objects, the present invention provides a transmission device for a bicycle, the transmission device comprising : a first transmission means for obtaining forward driving force by driving a first free wheel in conformity to a movement of a first drive unit when a crank shaft is forwardly rotated; and, a second transmission means for obtaining a forward driving force supplied to a second free wheel owing to a rotational direction of a second drive unit, the rotational direction being provided to a second free wheel under a reverse rotation of the crank shaft.

The above and other objects, features and advantages will become apparent from the following description taken with reference to the accompanying drawings.

DETAILED DESCRIPTION OF THE PREFERRED EMBODIMENT

Hereinafter, a preferred embodiment of the present invention will be described in detail with reference to the accompanying drawings.

Figure 1:
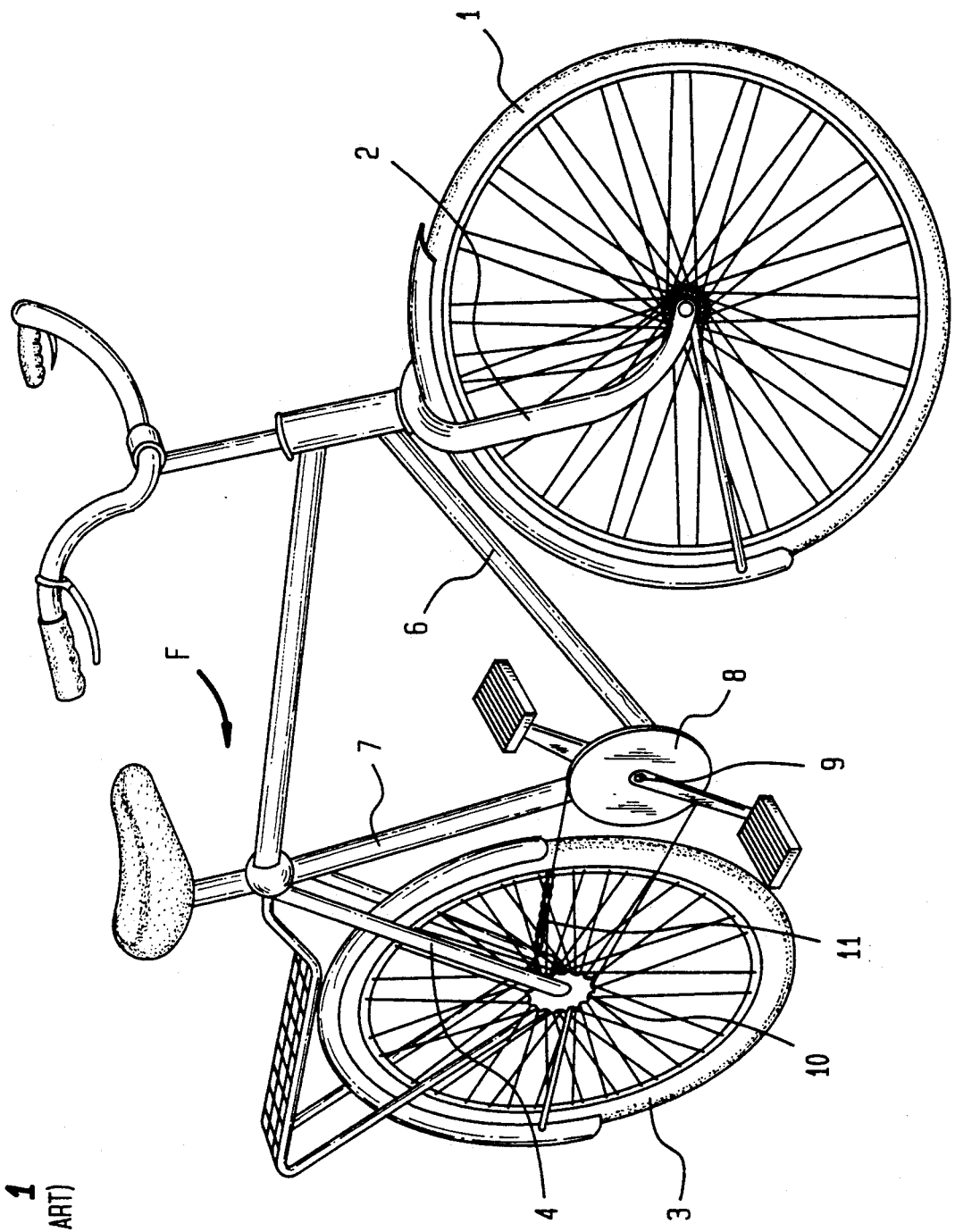
FIG. 1 is a perspective view of a bicycle fabricated according to the conventional manner.
Figure 2:
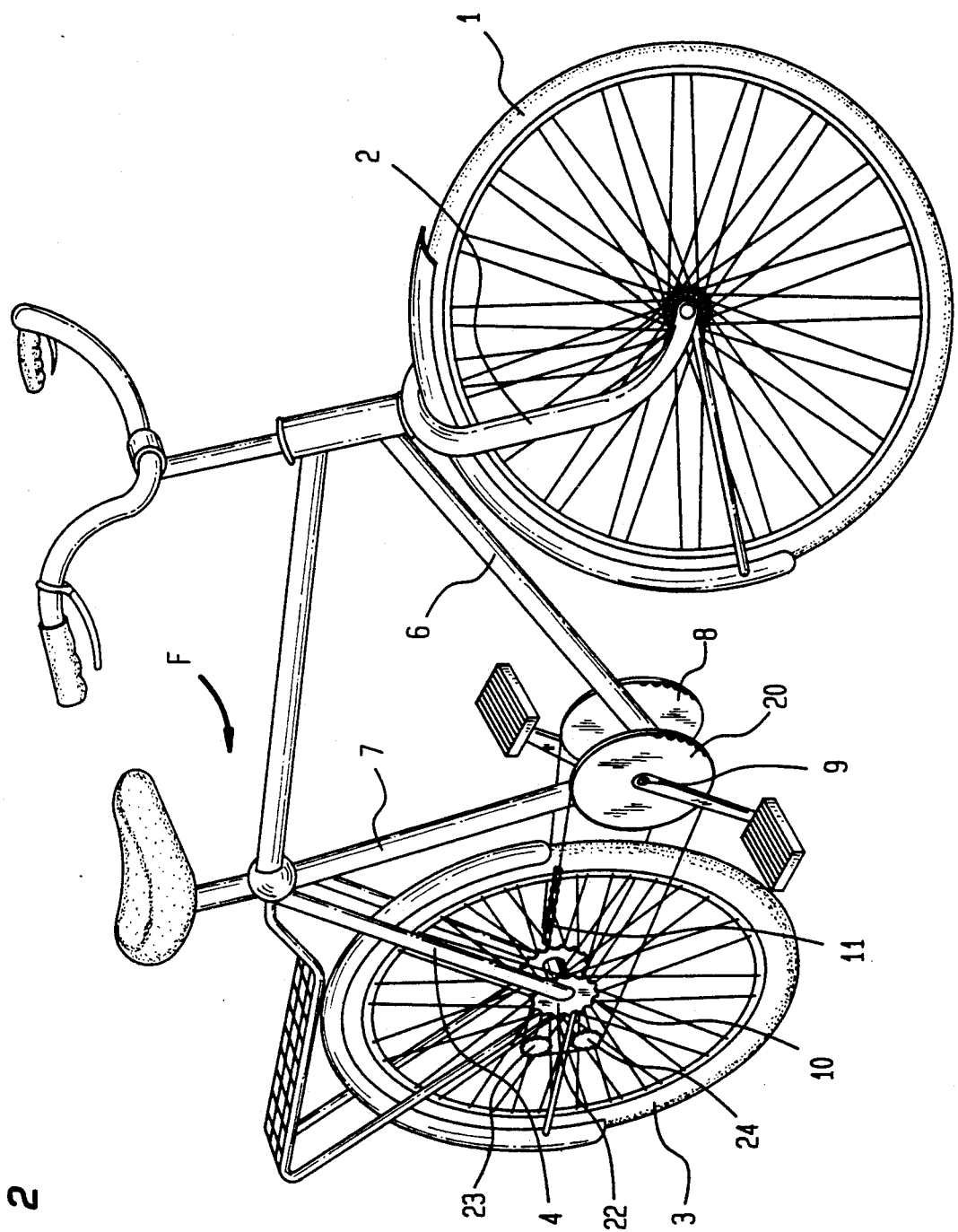
FIG. 2 is a perspective view of a bicycle employed with a transmission device according to the present invention.

Referring to FIG. 2, there is shown a perspective view of a bicycle in which a transmission device according to the present invention is additionally employed to a conventional bicycle transmission device. In the drawing, a first transmission means includes a first chain gear 8, a first free wheel 10 and a first driving chain 11, which are fixedly assembled to a side portion of the crank shaft and the hub of the rear wheel 3.

Figure 3:
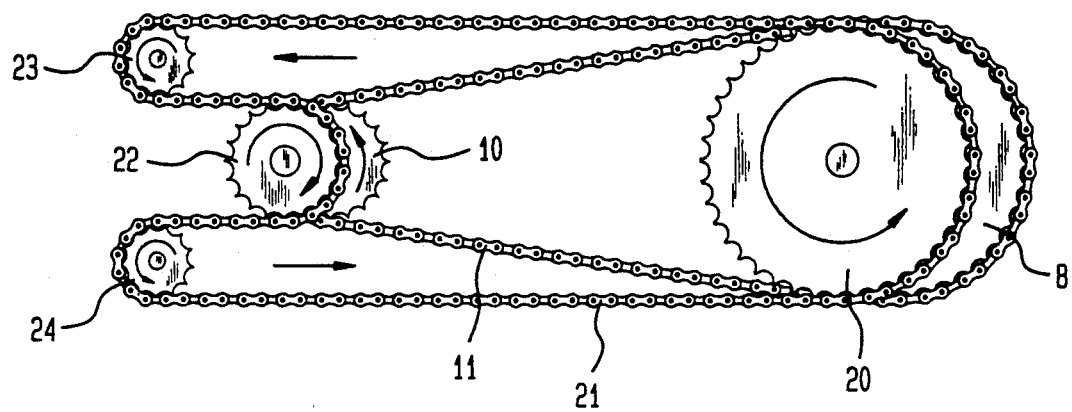
FIGS. 3 to 6 are views illustrating different examples of the transmission device of the bicycle according to the present invention.

A second transmission means includes a second driving chain 21 rotated by a second chain gear 20 fixedly coupled to the crank shaft 9, a tension pulley 23 and a guide pulley 24 which are coupled to the hub shaft of the rear wheel 3, and are fixed to the hub of the rear wheel 3 so that a second free wheel 22 is positioned between the tension pulley 23 and the guide pulley 24, as shown in FIG. 3. Moreover, sprockets (not shown)of the free wheels 10 and 22 of the bicycle shown in FIG. 2 are rotated in the opposite direction with each other.

According to the transmission device for the bicycle of the present invention, if the crank shaft 9 is forwardly rotated, the forward driving force is obtained by the first transmission device unit having a conventional construction. Also, if the crank shaft is reversely rotated, the forward driving force is obtained by the second transmission device unit according to the present invention.

Now, an operation in which the forward driving force is always obtained even if the rotational direction of the crank shaft is changed by means of the transmission device for the bicycle thus constructed will be effected as follows.

In FIG. 2, when the crank shaft 9 is rotated in a clockwise direction, that is, in a forward direction, the first and second chain gears 8 and 20 are forwardly rotated while the first and second free wheels 10 and 22 are rotated in the opposite direction with each other by means of the first and second driving chains 11 and 21. In this case, the rotational force of the sprocket of the first free wheel 10 is transferred to the first free wheel 10 to thereby obtain the forward driving force. At this time, the sprocket of the second free wheel 22 is rotated in a direction opposite to that of the first free wheel 10 by the tension pulley 23 shown in FIG. 3, in other words, the second free wheel 22 is idled.

On the contrary, when the crank shaft 9 is rotated in a counterclockwise direction, that is, in a reverse direction, the first and second chain gears 8 and 20 are rotated and the first and second driving chains 11 and 21 are also rotated, so that the sprocket of the first free wheel 10 is idled while the sprocket of the second free wheel 22 is forwardly rotated to obtain the forward driving force.

Figure 4A:
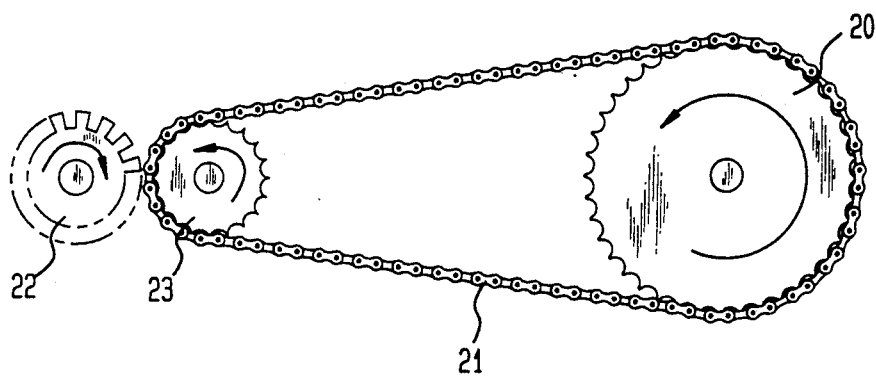
Figure 4B:
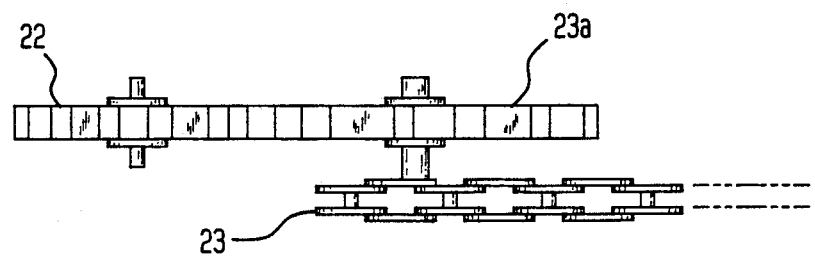
Figure 5:
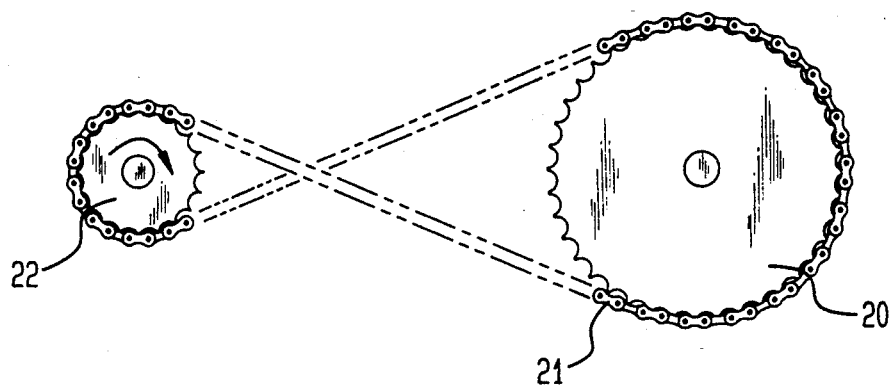

FIGS. 4 and 5 show views illustrating modified examples of the second transmission means according to the present invention.

In the second transmission means shown in FIG. 4, the second driving chain 21 is disposed to rotate about the second chain gear 20 and the tension pulley 23. This tension pulley 23 is fixed to a gear 23A having a given size by means of a fixing pin, and the second free wheel 22 is engaged to the gear 23A.

According to the second transmission means thus constructed, it is possible to obtain the forward driving force as the crank shaft 9 is reversely rotated. More particularly, if the crank shaft 9 is reversely rotated, then the tension pulley 23 and the gear 23A coupled to the tension pulley 23 are reversely rotated and the second free wheel 22 is forwardly rotated, so that the forward driving force is produced for driving the bicycle.

Meanwhile, the second transmission means shown in FIG. 5 has the second driving chain 21 which is disposed in a criss-crossed pattern around and second chain gear 20, i.e., in an "oo" shape, to the second free wheel 22. With the second transmission means, the second free wheel 22 is rotated in a direction opposite to that of the second chain gear 20 to thereby obtain the forward driving force.

Figure 6:
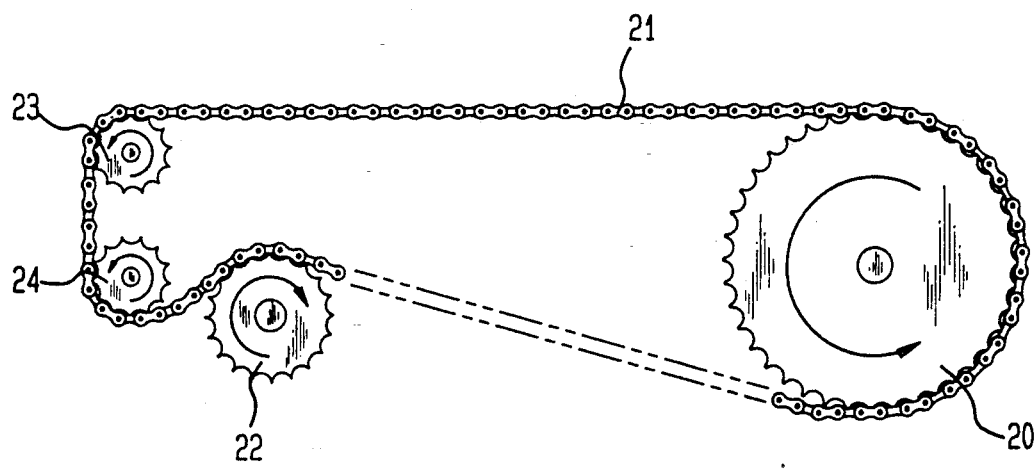
Figure 7A:
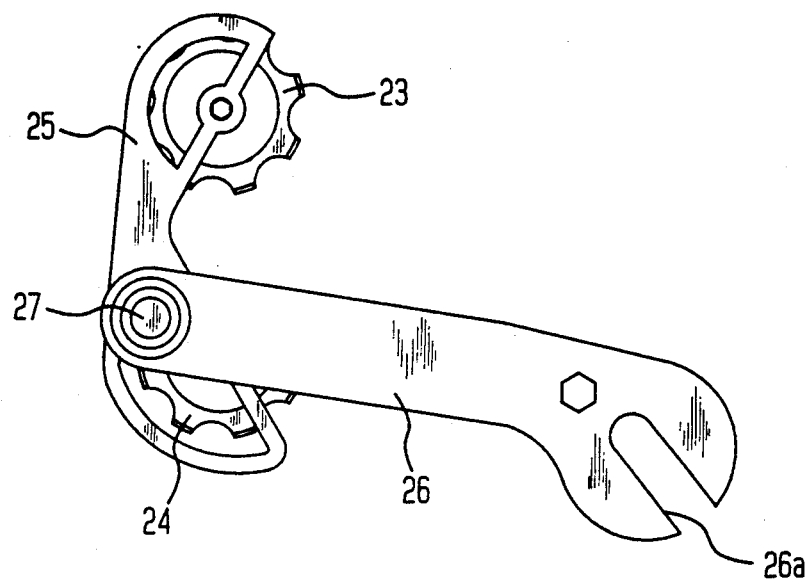
FIGS. 7A and 7B is a view showing a driving chain guide mechanism which is employed with the transmission device of the bicycle in FIG. 6; and, FIGS. 8A, 8B, 9A and 9B are views showing modified examples of the guide mechanism used with the transmission device of the bicycle according to the present invention.
Figure 7B:
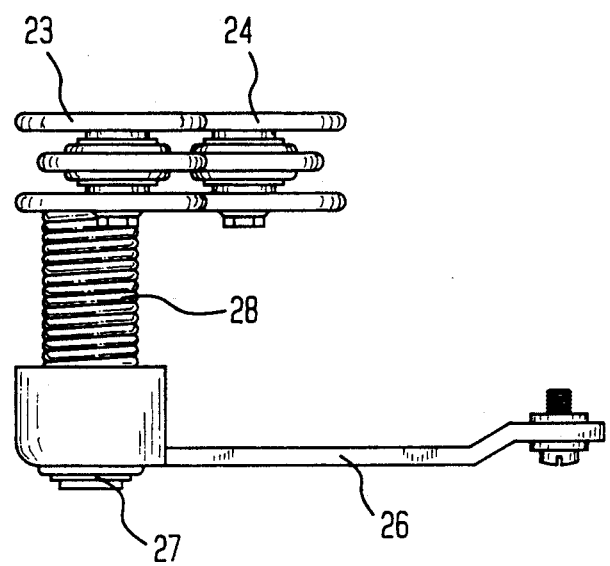

Referring to FIG. 6, there is shown a preferred embodiment of the second transmission means according to the present invention. With the trans- mission means in FIG. 6, a chain guide mechanism A is disposed at an upward side of the second free wheel 22 mounted on the hub so that rotational force of the second driving chain 21 rotated by the second chain gear 20 is provided to the guide mechanism A and the second free wheel 22 in order, and the second free wheel 22 is disposed which is associated at the outer lower side of the periphery of the second driving chain 21.

In the second transmission means arranged as described above, if the crank shaft 9 is reversely rotated, the second free wheel 22 is forwardly rotated while the tension pulley 23 and the guide pulley 24 in the guide mechanism A are reversely rotated, so that the bicycle having the aforementioned second transmission means enables to take the forward driving force even if the crank shaft 9 is reversely rotated.

Moreover, in the guide mechanism A a stationary member 26 is fixed to a shaft of the hub, a chain guide 25 having the tension pulley 23 and the guide pulley 24 coupled thereto is supported toward the stationary member 26 by means of a horizontal pin 27, and a tension spring 28 is disposed between the chain guide 25 and the stationary member 26 to rotate the chain guide 25 in a counterclockwise direction centering around the horizontal pin 27 so as to provide a certain tension to the driving chain.

Figure 8A:
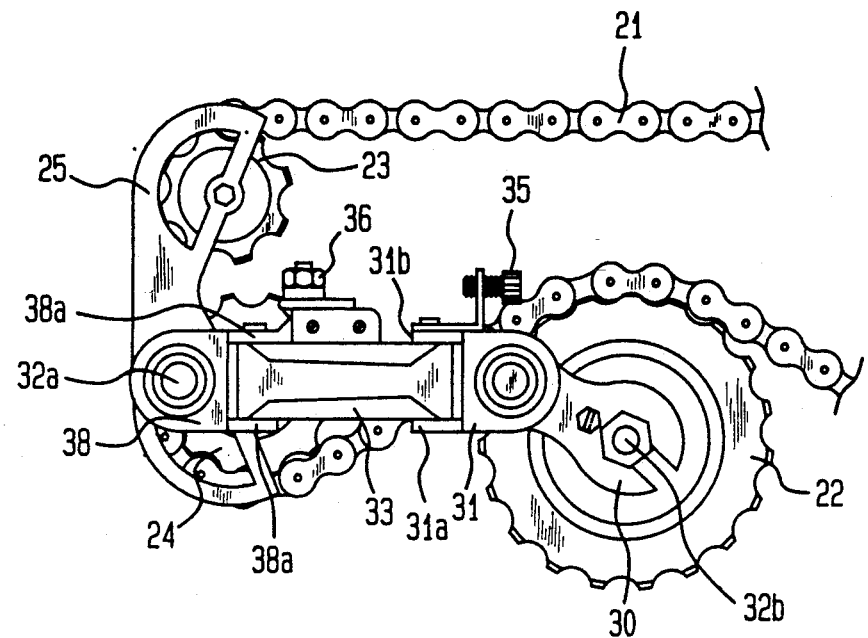
Figure 8B:
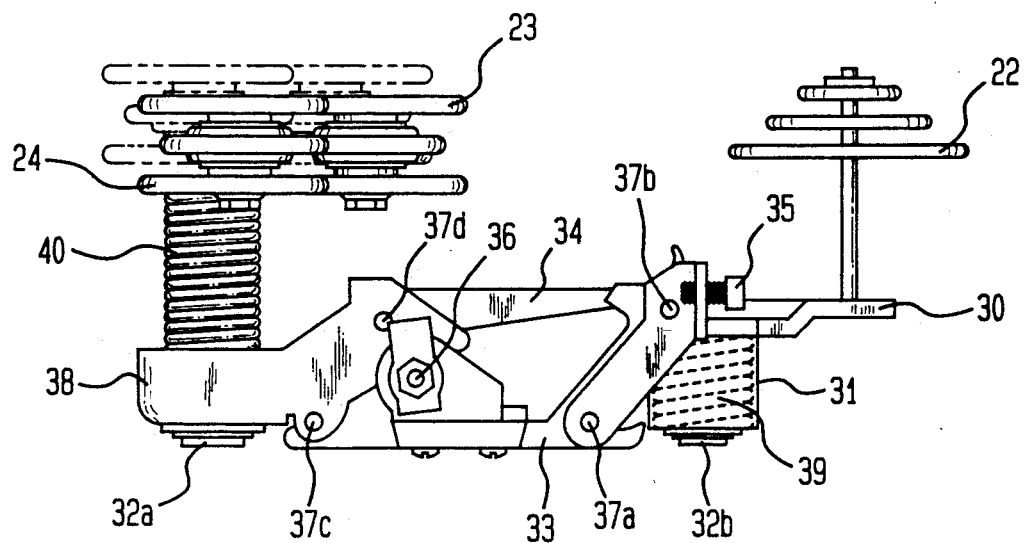
Figure 9A:
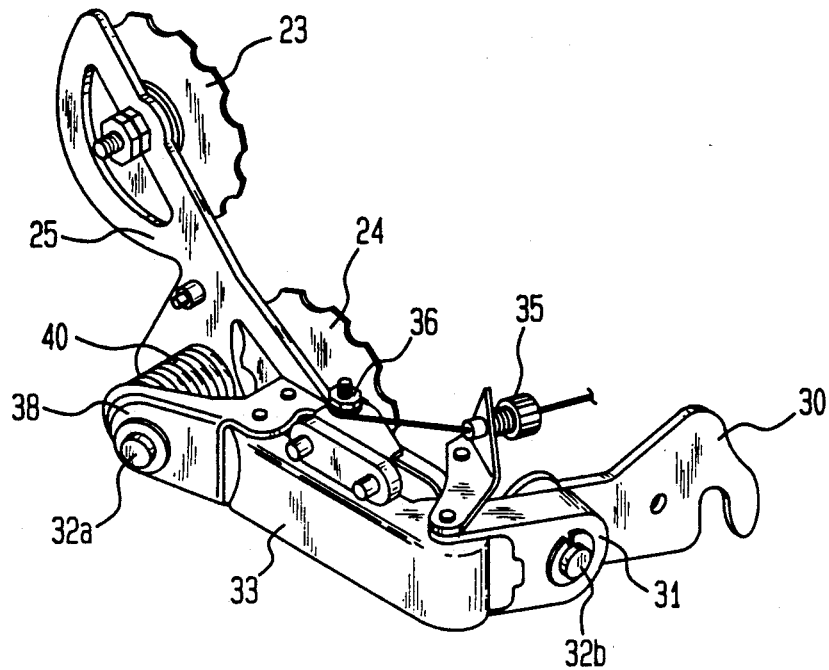
Figure 9B:
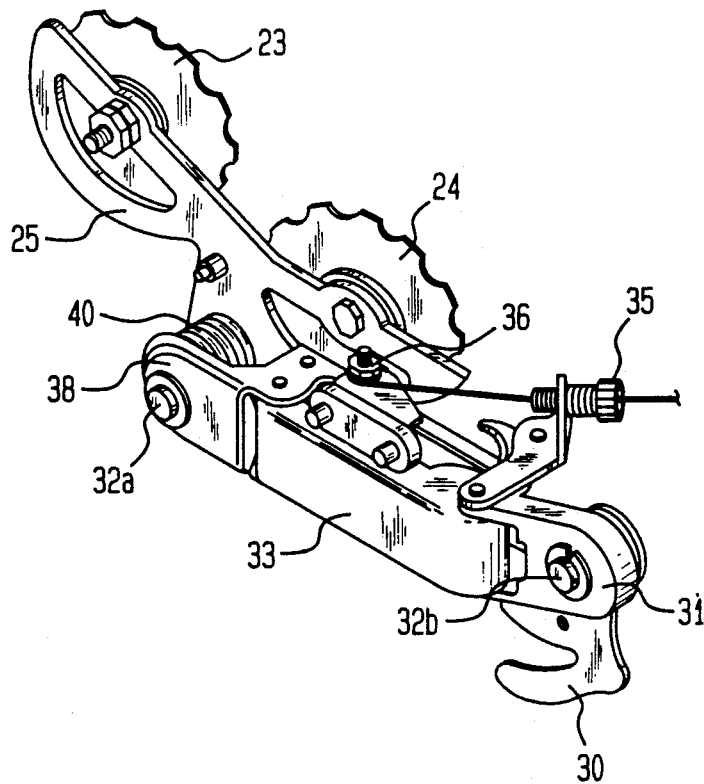

Referring to FIGS. 8 and 9, there are shown different guide mechanisms for changing the forwardly running velocity, which are employed with the second transmission means according to the present invention, respectively.

In the drawings, a fixed member 30 is fixedly connected to the hub shaft and a supporting member 31 is movably supported toward the fixed member 30 by means of a first horizontal pin 32A. The supporting member 31 has a pair of link members 33 and 34 oppositely spaced at a certain distance, a support element 35 for supporting a casing (not shown) for guiding a control wire and a fixing element 36 for fixing the support element 35.

The link members 33 and 34 are located at their respective ends between supporting arms 31a and 31b of the supporting member 31 and movably supported toward the supporting member 31 by first and second vertical pins 37a and 37b.

Also, a movable member 38 is movably connected to the opposite ends of the link members 33 and 34 by means of third and fourth vertical pins 37c and 37d. The movable member 38 has a shape similar to that of the supporting member 31 and includes connecting arms 38a and 38b for connecting it with the link members 33 and 34 and a fixing element 36 for fixing one end of the control wire. The movable member 38 movably supports the chain guide 25 having two pulleys, for example, guide pulley 23 and tension pulley 24 by using a second horizontal pin 32B. Furthermore, a tension spring 39 is disposed between the fixed member 30 and the supporting member 31 and an additional tension spring 40 is disposed between the chain guide 25 and the movable member 38. These springs serve to rotate the supporting member 31 and the chain guide 25 in a counterclockwise direction centering around the first and second horizontal pins 32A and 32B so that the second driving chain 21 receives a constant tension. The tension springs 39 and 40 are composed of coil springs of which one end is bended and coupled to the side surface of the fixing member 30 and the chain guide 25, respectively, and the other end is energized toward the supporting member 31 and the movable member 38.

In the construction as described above, the supporting member 31, the link members 33 and 34 and the movable member 38 form a pantagraph mechanism having a parallelogram shape. The movable member 38 is moved in a direction of an axis of the f roe wheel 22 due to the deformation of the parallelogram. More particularly, if the wire is fixed to the fixing element and operated under the casing for guiding the wire is supported to the supporting element 35 in order to deform the pantagraph mechanism, the movable member 38 is moved in a direction of an axis of the f roe wheel 22 as shown in FIG. 9 and, due to the movement of the movable member 38, the driving chain 21 engaged with one sprocket of the free wheel 22 can be engaged with the other sprocket.

As described above, according to the transmission device of the present invention, it is possible to obtain the forward driving force even if the crank shaft is rotated forwardly or reversely. As a result, it has advantages in that users can push pedals of the bicycle and an effect of exercise is considerably improved.

What is claimed is:

1. A transmission device for a bicycle comprising:
   a first transmission means for obtaining a forward driving force wherein a first free wheel is driven in conformity with a movement of a first drive unit when a crank shaft is forwardly rotated; and a second transmission means for obtaining said forward driving force wherein a rotational force is produced in a rotational direction of a second drive unit, said rotational force being applied to a second free wheel under a reverse rotation of crank shaft.

2. The transmission device for a bicycle according to claim 1, wherein said transmission device includes a rear wheel having a hub shaft and wherein said second transmission means further includes a chain gear fixedly coupled to said crank shaft, a driving chain rotated by said chain gear, a tension pulley and a guide pulley which are coupled to said hub shaft of said rear wheel so that said second free wheel is positioned between said tension pulley and said guide pulley.

3. The transmission device for a bicycle according to claim 2 wherein said driving chain is rotated along the periphery of said chain gear and said tension pulley.

4. The transmission device for a bicycle according to claim 3 wherein said second transmission means further comprises a gear coupled to said tension pulley and said second free wheel engaging said gear.

5. The transmission device for a bicycle according to claim 4 wherein said driving chain of said second transmission means is arranged in a criss-crossed pattern around said chain gear and said second free wheel.

6. The transmission device for a bicycle according to claim 5 wherein said second transmission means further includes a chain guide mechanism mounted on said hub and positioned at an upward side of said second free wheel so that said rotational force of said drive chain rotated by said chain gear is sequentially provided to said chain guide mechanism and to said second free wheel.

7. The transmission device for a bicycle according to claim 6 wherein said second free wheel is disposed so as to contact an outer lower side of the periphery of said driving chain.

8. The transmission device for a bicycle according to claim 7 wherein said chain guide mechanism includes a stationary member having an end fixedly connected to a hub shaft by means of a horizontal pin and a supporting frame said chain guide having said tension pulley and said guide pulley coupled thereto.

9. The transmission device for a bicycle according to claim 8 further comprising a tension spring disposed between said stationary member and said chain guide for rotating said chain guide in a counterclockwise direction centering around said horizontal pin.

10. The transmission device for a bicycle according to claim 9 wherein said guide mechanism further comprises a supporting member movably connected to said supporting frame and movable towards said stationary member.

11. The transmission device for a bicycle according to claim 10 wherein said guide mechanism further comprises a pair of link members movably connected to said supporting frame by a first and second vertical pin.

* * * * *